(12) United States Patent
Mehr et al.

(10) Patent No.: US 10,839,267 B2
(45) Date of Patent: Nov. 17, 2020

(54) LEARNING AN AUTOENCODER

(71) Applicant: DASSAULT SYSTEMES, Velizy Villacoublay (FR)

(72) Inventors: Eloi Mehr, Velizy-Villacoublay (FR); Andre Lieutier, Velizy-Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 281 days.

(21) Appl. No.: 15/965,123

(22) Filed: Apr. 27, 2018

(65) Prior Publication Data
US 2018/0314917 A1 Nov. 1, 2018

(30) Foreign Application Priority Data

Apr. 27, 2017 (EP) .................................... 17305475

(51) Int. Cl.
| | | |
|---|---|---|
| *G06T 9/00* | (2006.01) | |
| *G06K 9/62* | (2006.01) | |
| *G06K 9/66* | (2006.01) | |
| *G06K 9/00* | (2006.01) | |
| *G06N 3/08* | (2006.01) | |
| *G06N 3/04* | (2006.01) | |
| *G06T 7/30* | (2017.01) | |
| *G06T 3/00* | (2006.01) | |

(Continued)

(52) U.S. Cl.
CPC .......... *G06K 9/6262* (2013.01); *G06F 30/00* (2020.01); *G06K 9/00214* (2013.01); *G06K 9/6203* (2013.01); *G06K 9/6274* (2013.01); *G06K 9/66* (2013.01); *G06N 3/04* (2013.01);

*G06N 3/0454* (2013.01); *G06N 3/088* (2013.01); *G06T 3/0068* (2013.01); *G06T 7/30* (2017.01); *G06F 2111/04* (2020.01); *G06T 2200/04* (2013.01)

(58) Field of Classification Search
CPC ............. G06K 9/6262; G06K 9/00214; G06K 9/6203; G06K 9/6274; G06K 9/66
See application file for complete search history.

(56) References Cited

U.S. PATENT DOCUMENTS 9,536,177 B2 * 1/2017 Chalasani ............ G06N 3/0454
9,916,542 B2 * 3/2018 Chidlovskii ....... G06K 9/00684
(Continued)

OTHER PUBLICATIONS

Extended Search Report dated Mar. 28, 2018, in European Patent Application No. 17305475.0-1231 (9 pgs).
(Continued)

*Primary Examiner* — Gregory M Desire
(74) *Attorney, Agent, or Firm* — Oblon, McClelland, Maier & Neustadt, L.L.P.

(57) ABSTRACT

A computer-implemented method for learning an autoencoder notably is provided. The method comprises providing a dataset of images. Each image includes a respective object representation. The method also comprises learning the autoencoder based on the dataset. The learning includes minimization of a reconstruction loss. The reconstruction loss includes a term that penalizes a distance for each respective image. The penalized distance is between the result of applying the autoencoder to the respective image and the set of results of applying at least part of a group of transformations to the object representation of the respective image. Such a method provides an improved solution to learn an autoencoder.

31 Claims, 3 Drawing Sheets

(51) Int. Cl.
*G06F 30/00* (2020.01)
*G06F 111/04* (2020.01)

(56) References Cited

U.S. PATENT DOCUMENTS

| | | | |
|---|---|---|---|
| 10,354,199 B2* | 7/2019 | Clinchant | G06N 3/0454 |
| 10,460,213 B2* | 10/2019 | Kang | G06K 9/6267 |
| 2016/0292589 A1* | 10/2016 | Taylor, Jr. | G06F 16/1744 |
| 2018/0314917 A1* | 11/2018 | Mehr | G06N 3/04 |

OTHER PUBLICATIONS

Anastasia Ioannidou, et al.; "Deep Learning Advances in Computer Vision with 3D Data: A Survey"; ACM Computing Surveys; vol. 50; No. 2; Article 20, Publication date. Apr. 2017, 38 pgs.

Kihyuk Sohn, et al.; "Learning Invariant Representations with Local Transformations", Jun. 27, 2012, XP055437554, Retrieved from the Internet: URL:https://arxiv.org/ftp/arxiv/papers/1206/1206_6418pdf; 8 pgs.

Holger Schwenk; "The Diabolo Classifier": Neural Computation 10; vol. 10; No. 8, Nov. 1998; XP055437540; 26 pgs.

Patrice Y. Simard, et al.; "Transformation Invariance in Pattern Recognition—Tangent Distance and Tangent Propagation"; 2012, ECCV 2018 Conference, (Lecture Notes in Computer Science: Lect. Notes Computer); Springer International Publishing, Chavi. XP047388454; ISSN: 0302-9743. ISBN: 978-3-642-33485-6; 35 pgs.

Rohit Girdhar, et al.; "Learning a Predictable and Generative Vector Representation for Objects"; Sep. 17, 2016; ECCV Conference; Lecture Notes in Computer Science; Lect. Notes Computer; Springer International Publishing, Cham; XP047355277; 16 pgs.

Dmitry Laptev, et al.; "Ti-Pooling: Transformation-Invariant Pooling for Feature Learning in Convolutional Neural Networks"; 2016 IEEE Conference on Computer Vision and Pattern Recognition; (CVPR), IEEE, Jun. 27, 2016; XP033021204; 9 pgs.

Danilo Jimenez Rezende, et al.; "Stochastic Backpropagation and Approximate Inference in Deep Generative Models"; Proceedings of the 31st International Conference on Machine Learnings, Beijing, China; 2014; JMLR: W&CP; vol. 32; 9 pgs.

Pascal Vincent, et al.; "Stacked Denoising Autoencodors: Learning Useful Representations in a Deep Network with a Local Denoising Criterion"; Journal of Machine Learning Research 11; 2010; 38 pgs.

Gary K. L. Tam, et al.; "Registration of 3D Point Clouds and Meshes: A Survey from Rigid to Nonrigid"; (Abstract); IEEE Transactions on Visualization and Computer Graphics; vol. 19; Jul. 7, 2013; 4 pgs.

G. E. Hinton, et al.; "Reducing the Dimensionality of Data with Neural Networks"; Jul. 28, 2006; vol. 313; Science; www.sciencemag.org; 4 pgs.

Hang Su, et al.; "Multi-view Convolutional Neural Networks for 3D Shape Recognition"; arXiv:1505.00880v2 [cs.CV]; Jun. 3, 2015; 12 pgs.

Vladimir G. Kim, et al.; "Learning Part-based Templates from Large Collections of 3D Shapes"; 12 pgs.

Yoshua Bengio; "Learning Deep Architectures for AI"; Dept. IRO, Universite De Montreal; http://.www.iro.umontreal.ca/-bengioy; Technical Report 1312; 56 pgs.

Qixing Huang, et al.; "Joint Shape Segmentation with Linear Programming"; Standford University; 11 pgs.

Yoshua Bengio, et al., "Greedy Layer-Wise Training of Deep Networks"; Universite De Montreal, 8 pgs.

Ian J. Goodfellow, et al.; "Generative Adversarial Nets"; Departement D'Informatique Et De Recherche Operationnelle; arXiv:1406.3661V1 [stat.ML]; Jun. 10, 2014, 9 pgs.

Yoshua Bengio, et al., "Generalized Denoising Auto-Encoders as Generative Models", Departement D'Informatique Et Recherche Operationnelle, Universite De Montreal; 9 pgs.

Pascal Vincent et al.; "Extracting and Composing Robust Feature with Denoising Autoencoders"; Universite De Montreal; Appearing in Proceedings of the 25th International Conference on Machine Learning, Helsinki, Finland, 2018, 8 pgs.

Devrim Akca; "Co-registration of Surfaces by 3D Least Squares Matching"; Photogrammetric Engineering & Remote Sensing; vol. 76, No. 3; Mar. 2010; 12 pgs.

Aleksey Golovinskiy, et al.; "Consistent Segmentation of 3D Models", Princeton University; Preprint Submitted to Computers and Graphics; Feb. 25, 2009; 9 pgs.

Diederik P Kingma, et al ; "Auto-Encoding Variational Bayes"; arXiv•1312.6114v10; [statML]; May 1, 2014; 14 pgs.

Melinos Averkiou, et al., "Autocorrelation Descriptor for Efficient Co-Alignment of 3D Shape Collections", Computer Graphics Forum; 2015; 11 pgs.

Mohamed Chaouch, et al.; "Alignment of 3D Models"; HAL ID HAL-00804653; https:hal_inria_fr/hal-00804653; Oct. 22, 2015; 28 pgs.

Diederik P. Kingma, et al.; "Adam: A Method for Stochastic Optimization"; Published as a Conference Paper at ICLR 2015; arXiv:1412.6980V9; [cs.LG]; Jan. 30, 2017; 15 pgs.

Yunhai Wang, et al.; "Active Co-Analysis of a Set of Shapes"; ACM Transactions on Graphics; vol. 31, No. 6; Article 165, Nov. 2012; 10 pgs.

Esma Elghoul, et al.; "A Segmentation Transfer Approach for Rigid Models"; HAL ID: HAL-01081374; https://hal.inria/fr/hal-01081374; Nov. 7, 2014; 16 pgs.

Geoffrey E. Hinton, et al.; "A Fast Learning Algorithm for Deep Belief Nets"; To Appear in Neural Computation 2006; 16 pgs.

* cited by examiner

LEARNING AN AUTOENCODER

CROSS-REFERENCE TO RELATED APPLICATIONS

This application claims priority under 35 U.S.C. § 119 or 365 to European Application No. EP 17305475.0 filed on Apr. 27, 2017. The entire contents of the above application(s) are incorporated herein by reference.

FIELD OF THE INVENTION

The invention relates to the field of computer programs and systems, and more specifically to methods, devices, data structures and programs for learning an autoencoder.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, machine learning and in particular autoencoder and/or manifold learning is gaining wide importance.

The following papers relate to this field and are referred to hereunder:
- [1]: "Stacked Denoising Autoencoders: Learning Useful Representations in a Deep Network with a Local Denoising Criterion", P. Vincent, H. Larcohelle, I. Lajoie, Y. Bengio, P. Manzagol, in The Journal of Machine Learning Research, 2010.
- [2]: "Reducing the Dimensionality of Data with Neural Networks", G. E. Hinton, R. R. Salakhutdinov, in Science, 2006.
- [3]: "Generalized Denoising Auto-Encoders as Generative Models", Y. Bengio, L. Yao, G. Alain, P. Vincent, in Advances in Neural Information Processing Systems, 2013.
- [4]: "Learning Deep Architectures for AI", Y. Bengio, in Foundations and Trends in Machine Learning, 2009.
- [5]: "Extracting and Composing Robust Features with Denoising Autoencoders", P. Vincent, H. Larochelle, Y. Bengio, P. Manzagol, W. Cohen, A. McCallum, S. Roweis, in International Conference on Machine Learning, 2008.
- [6]: "Greedy Layer-Wise Training of Deep Networks", Y. Bengio, P. Lamblin, D. Popovici, H. Larcohelle, B. Scholkopf, J. Platt, T. Hoffman, in Neural Information Processing Systems, 2007.
- [7]: "Auto-Encoding Variational Bayes", D. Kingma, M. Welling, in International Conference on Learning Representations, 2014.
- [8]: "Stochastic Backpropagation and Approximate Inference in Deep Generative Models", D. Rezende, S. Mohamed, D. Wierstra, in International Conference on Machine Learning, 2014.
- [9]: "Generative Adversarial Nets", I. Goodfellow, J. Pouget-Abadie, M. Mirza, B. Xu, D. Warde-Farley, S. Ozair, A. Courville, Y. Bengio, in Advances in Neural Information Processing Systems, 2014.
- [10]: "A Fast Learning Algorithm for Deep Belief Nets", G. Hinton, S. Osindero, Y. The, in Neural Computation, 2006.

Given a dataset of images representing samples for example from a same class, for instance a dataset of 2D images of chairs, or a dataset of 3D models of cars, autoencoder learning (explained in [1,2]) aims at learning a mapping (encoder) between the original input space of this dataset and a low-dimensional space, often called latent space. Moreover, autoencoders also learn a reverse mapping (decoder) from the latent space to the original input space. The quality of the learning of an autoencoder can be measured as the capacity of the autoencoder to encode an input, and then decode the encoded input back into an output close to the input according to a predetermined distance.

In this context, there still exists a need for an improved solution to learn an autoencoder.

SUMMARY OF THE INVENTION

It is therefore provided a computer-implemented method for learning an autoencoder. The method comprises providing a dataset of images. Each image includes a respective object representation. The method also comprises learning the autoencoder based on the dataset. The learning includes minimization of a reconstruction loss. The reconstruction loss includes a term that penalizes a distance for each respective image. The penalized distance is between the result of applying the autoencoder to the respective image and the set of results of applying at least part of a group of transformations to the object representation of the respective image.

The method may comprise one or more of the following:
- the autoencoder is invariant with respect to at least part of the group of transformations;
- the autoencoder includes a transformation component configured to apply each one of the at least part of the group of transformations to the object representation of an input image, an aggregation component configured to be applied to results stemming from the transformation component, an encoding component and a decoding component;
- the encoding component is configured be applied in parallel to each result of the transformation component;
- the aggregation component is configured to be applied to the results of the encoding component;

the decoding component is configured to be applied to the result of the aggregation component;

the encoding component and/or the decoding component includes a convolutional neural network;

the results stemming from the first component to which the aggregation component is configured to be applied are vectors of a same size, the aggregation component outputting a vector of the same size having for each coordinate a value equal to the maximum among the values of said coordinate for the vectors to which the aggregation component is configured to be applied;

the images are surface occupancy 3D models, the group of transformations including translations; and/or the object representations are each a representation of an instance of a same class of objects, each image of the dataset having a non-oriented frame, each object representation being aligned in the non-oriented frame, the group of transformations including all rotations from one alignment in the non-oriented frame to another alignment in the non-oriented frame.

It is further provided information which include an encoder, a decoder, and/or the whole of an autoencoder learnable by the method. The whole of an autoencoder consists of the autoencoder itself. The autoencoder comprises an encoder configured to encode any input belonging to an image space, for example into a vector belonging to a latent space, and a decoder configured to decode any vector belonging to the latent space into an output belonging to the image space. Such provided information may be used in any way.

It is further provided a computer program comprising instructions for performing the method and/or the process.

It is further provided a data structure comprising the information and/or the program. It is further provided a computer readable storage medium having recorded thereon the data structure.

It is further provided a device comprising a data storage medium having recorded thereon the data structure. The device may form a non-transitory computer-readable medium. The device may alternatively comprise a processor coupled to the data storage medium. The device may thus form a system. The system may further comprise a graphical user interface coupled to the processor.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
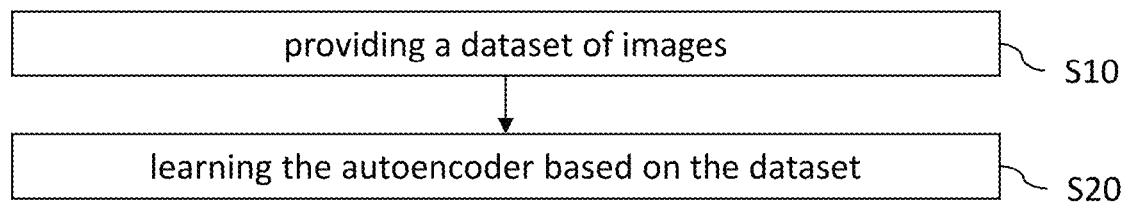
FIG. 1 shows a flowchart of an example of the method.

FIG. 1 shows an example of the method for learning an autoencoder.

As classical from such a learning, the method comprises providing S10 a dataset of images and learning S20 the autoencoder based on the dataset. The learning includes minimization of a reconstruction loss. The minimization may be performed in any way and may constitute an exact minimization or a pseudo minimization. The reconstruction loss includes or consists of, for each respective image of the dataset, a respective term that penalizes a distance for the respective image of the dataset. The distance may be the value of a same distance function for each respective image.

Now, in the case of the method, each image includes a respective object representation. Then, the distance penalized in the reconstruction loss is, for each given image, a distance between the result of applying the autoencoder to the given image and the set of results of applying at least part of a group of transformations to the object representation of the given image. The distance may be any distance between an element of the image type and a set of elements each of the image type. The distance may implement an image distance, that is, a distance between two elements of the image type. The distance may for example be the minimum of image distances each between the given image and a respective one of the set of results of applying the at least part of a group of transformations to the object representation of the given image.

Applying a transformation to the object representation of an image amounts to processing the image such that the resulting image is of the same format, with the object representation modified in the resulting image according to the transformation. A group of transformations is any set of operations applicable to an object representation of an image. The set may form an algebraic group. The group of transformations and/or the at least part of the group may be the same set for all images of the dataset. The group of transformations may include or consist of geometric transformations, for example including or consisting of one or more (e.g. all) translations, one or more (e.g. all) rotations, one or more (e.g. all) rigid motions, one or more (e.g. all) isometries, one or more non-isometric transformations such as one or more (e.g. all) stretching or scaling transformations, or any combination thereof.

Such a method improves autoencoder learning.

Notably, the autoencoder learnt by the method is relatively more accurate with respect to the variability of the object representation relative to the group of transformations. Indeed, by using for each respective image a penalization term that is indifferent to transforming the object representation (in line with the provided part of the group of transformations), the learning can focus on other aspects of the reconstruction, for example such as geometrical reconstruction rather than orientation. Thanks to the specific distance penalizing term of the reconstruction loss, the learning is such that the autoencoder is provided with freedom to transform the object representation of the respective image according to any one of said at least part of the group of transformations. In other words, the autoencoder is authorized to modify each input image by applying any one of said at least part of the group of transformations to the object represented in the input image, without such modification having an impact on said term of the reconstruction loss. Such freedom offers new possibilities to the minimization. The autoencoder eventually learnt is thereby improved, relative to prior art reconstruction losses not providing such freedom, for example where the only distance penalized in the reconstruction loss is between the result of applying the autoencoder to a respective image of the dataset and the respective image as such, that is, without any transformation.

The group of transformations may be predetermined and correspond to an objective of learning an autoencoder indifferent to said group of transformations (as explained above). For this reason, the autoencoder learnt by the method may be referred to as a "quotient" autoencoder and the reconstruction loss may be referred to as a "quotient" loss.

Now, the group of transformations may be finite or infinite. In the case of a finite group of transformations, all the transformations may be considered by the minimization (i.e. the at least part of the group consists of the whole group). In all cases and notably the case of an infinite group, a strict subpart thereof may be considered. In all cases, the part of the group may be a sampling of the group, for example a regular sampling (e.g. according to a probability measure defined on the group, e.g. a uniform measure, notably in the case of a Lie group such the rotations group). The sampling may be a relatively dense sampling. This allows a robust learning.

An image contemplated by the method is a data structure that represents a spatial distribution of a physical signal, for example on a scene, e.g. the distribution being piecewise continuous. The spatial distribution may be of any dimension, for example 2D or 3D. The spatial distribution may be of any shape, for example forming a grid and thereby defining pixels, the grid being possibly irregular or regular. The physical signal may be any signal, for example color, level of gray, depth, surface or volume occupancy, such that the image may be a 2D or 3D RGB/grayscale/depth image, or a 3D surface/volume occupancy model. The image may be a synthetic image, such as a designed 3D modeled object, or alternatively a natural image, such as a photo. The provided images and/or to which the autoencoder is to apply may all be a of a same type, for example among the above-mentioned example types.

An image contemplated by the method is a modeled object. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A 3D modeled object of the dataset may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

The dataset may include or consist of images where the object representations are each a representation of an instance of a same class of objects. The expression "object class" designates any class of entities (i.e. objects) which can be instantiated in an image. An object class is said to be instantiated in an image if an object of the object class, in other words an instance of the class, is represented in the image.

The dataset provided by the method may include images with non-aligned object representations of a same class. The dataset may be inputted directly to the learning (i.e. as such). In other words, the method may exclude any pre-processing to align the object representations. Also, the autoencoder may be configured to have all its outputs aligned or substantially aligned when images with object representations of a same class are inputted (the images being inputted aligned or not all aligned).

A frame (or "frame of reference" or yet "basis") contemplated by the method may be an orthogonal frame (i.e. defining three orthogonal directions). A frame contemplated by the method may have an origin, or alternatively no origin. A frame contemplated by the method may be oriented or non-oriented.

An image may have a frame, which may have an origin and/or an orientation. The frame of the image determines how to process the image, for example by the method. A 2D rectangular image for example has an (x,y) frame and a 3D image for example has an (x,y,z) frame. An image may be provided with the frame or with an orientation that indirectly defines said frame, which can thereby be determined. The relation (i.e. relative positioning) between the frame of an image and the image may be the same for all the images of the dataset.

Each object of the class may have a (e.g. unique and/or natural) non-oriented frame, and accordingly several natural oriented frames corresponding to the different orientations of the natural non-oriented frame. In other words, the class may be defined by such a predetermined non-oriented and/or oriented frame. For example, the class of cars or the class of chairs have a natural oriented frame, with the z-axis corresponding to the bottom-to-top direction, the x-axis corresponding to the left-to-right direction when sitting on or in the object, and the y-axis corresponding to the back-to-front direction when sitting on or in the object. A frame of an object representation in an image designates the virtual frame, corresponding to how the frame of the object would be represented in the image.

An object representation of an image may be said to be aligned with a non-oriented frame of the image if a non-oriented frame of the object representation is equal to the non-oriented frame of the image. Object representations of different images may be said to be aligned if, when oriented frames of the images are aligned, oriented frames of the object representations are also aligned.

In general, any learning can be done on non-aligned models. But one needs data dedicated to let the model learn by itself the rotation variability, which decreases the performance of the learning in terms of speed and quality in the prior art. Moreover, in the prior art, for a given architecture of an autoencoder, the latent vector is less expressive of the geometry of the models when they are not aligned as it has to encode a notion of rotation in addition to the intrinsic shape.

A solution different from the method could be to pre-process the dataset to co-align the images. This is now discussed with reference to the following papers:

[11]: "Alignment of 3D models", M. Chaouch, A. Verroust-Blondet, in International Conference on Shape Modeling and Applications, 2008.

[12]: "Autocorrelation Descriptor for Efficient Co-Alignment of 3D Shape Collections", M. Averkiou, V. Kim, N. Mitra, in Computer Graphics Forum, 2016.

[13]: "Co-registration of Surfaces by 3D Least Squares Matching", D. Akca, in Photogrammetric Engineering and Remote Sensing, 2010.

[14]: "Registration of 3D Point Clouds and Meshes: A Survey From Rigid to Non-Rigid", G. Tam, Z. Cheng, Y. Lai, F. Langbein, Y. Liu, A. David Marshall, R. Martin, X. Sun, P. Rosin, in IEEE Transactions on Visualization and Computer Graphics, 2013.

[15]: "A Segmentation Transfer Approach for Rigid Models", E. Elghoul, A. Verroust-Blondet, M. Chaouch, in Journal of Information Science and Engineering, 2015.

[16]: "Consistent Segmentation of 3D Models", A. Golovinskiy, T. Funkhouser, in Computer and Graphics, 2009.

[17]: "Joint Shape Segmentation with Linear Programming", Q. Huang, V. Koltun, L. Guibas, in SIGGRAPH Asia, 2011.

[18]: "Active Co-Analysis of a Set of Shapes", Y. Wang, S. Asafi, O. Van Kaick, H. Zhang, D. Cohen-Or, B. Chen, in SIGGRAPH Asia, 2012.

[19]: "Learning Part-based Templates from Large Collections of 3D Shapes", V. Kim, W. Li, N. Mitra, S. Chaudhuri, S. DiVerdi, T. Funkhouser, in SIGGRAPH, 2013.

Co-alignment consists in aligning a dataset of images (e.g. 3D models) in the same frame. Co-alignment is sometimes called rigid co-registration. Numerous techniques exist to co-align 3D models, sometimes based on symmetries and correlations analysis [11,12], sometimes on the minimization of a continuous energy [13,14]. Co-segmentation consists in segmenting a dataset of 3D models such that each segment of a 3D models has a corresponding segment in each of the other models. Many methods have been developed to tackle this problem, for example using graph clustering [16], linear programming [17], etc. Co-alignment and co-segmentation can also be done at the same time in a co-analysis framework, as done in [15,19].

But many drawbacks are inherent to the existing methods. Some require manual supervision [18], and the others require a low variability of the shapes. Some methods also need very clean meshes to be able to compute accurate features. Some methods compute the alignment of all the dataset by a pairwise matching of each element with respect to one reference mesh, but are not able to leverage the whole dataset at once to compute a consistent frame. Moreover, there is no fast way to co-align a new 3D model when the dataset has been aligned. Finally, if some errors are made, manifold learning cannot correct the mistakes in the alignment without learning all the possible rotations with data augmentation. The same drawbacks apply also to co-segmentation methods.

As the method may exclude any such pre-processing to align the object representations, the method does not present said drawbacks.

The autoencoder learnt by the method may be used in any application, for example to do realistic non-linear interpolation in the original spaces, extract meaningful features in data, and/or compress data into a compact representation.

The autoencoder may include the composition of two feedforward deep neural networks ([4]) which may be noted $f_W: \mathbb{R}^m \to \mathbb{R}^p$ and $g_{W'}: \mathbb{R}^p \to \mathbb{R}^m$, parameterized by the weights W and W', where p<<m, p is the dimension of the latent space, and m is the dimension of the original input space. $f_W$ is called the encoder, and $g_{W'}$ the decoder. z=f(x) is called the latent (or hidden) vector.

Let $D=\{x_1, \ldots, x_n\} \subset \mathbb{R}^m$ be the input dataset of images, where n is the number of samples.

A prior art learning method may learn the autoencoder $g_{W'} \circ f_W$ autoencoder by optimizing a reconstruction loss $E(W, W')=\Sigma_{i=1}^n \mathcal{L}(g_{W'} \circ f_W(x_i) - x_i)$, where L is a distance comparing the input sample and the reconstructed sample by the autoencoder, for example $\mathcal{L}$ can be the L2 norm. The method performs according to this principle, but with a difference in the definition of the penalization term involved in the reconstruction loss, as mentioned above and further detailed in the following.

In examples, the learning process can be made more robust by applying a random noise to each sample $x_i + \eta$ and train the autoencoder to reconstruct the clean version $x_i$. In such a case, this version of the autoencoder learnt by the method may be called "denoising autoencoder" (as explained in [5]).

In examples, the method may pre-train the architecture in a greedy layer-wise fashion, as explained in [6], a version called "stacked autoencoder".

Many architectures can be used for $f_W$ and $g_W$. For spatially structured data, such as images or 3D shapes, Convolutional Neural Networks (CNN) may be implemented as they prove to be very powerful.

For the encoder f, which reduces the dimensionality of the data, there is no particular problem. But the method also builds a convolutional decoder $g_W$. A simple way to do so is as follows. For an intermediate spatial representation I, the method may upsample the signal I (a process sometimes called up-pooling) and then apply to it a classical convolution. This operation may be called an "up-convolution" or a "transpose convolution".

In examples, the autoencoder learnt by the method may form a generative model (as explained in [3]). Generative models are probabilistic models which learn the distribution of the data. Thus, the autoencoder can also be used to synthesize new realistic models or images, based on what it has learnt from the dataset, by sampling the learned distribution of the data.

For that, the autoencoder may for example form a variational autoencoder (as explained in [7,8]). Compared to [3], the sampling process in a variational autoencoder is more efficient. The encoder of the variational autoencoder models $q_W(z|x)$ and the decoder models $p_W(x|z)$, where z is the latent vector. The variational autoencoder imposes a prior on p(z), and tries to make $q_W(z|x)$ as close as possible to p(z|x) in order to maximize the likelihood of p(x).

The method may use Gaussian models, and thus the variational autoencoder is similar to a deep latent Gaussian model. Actually, one can prove that the final loss to optimize in a variational autoencoder may be the traditional reconstruction loss of the autoencoder plus a regularization term (called latent loss) on the latent space which makes q(z|x) close to p(z|x).

The autoencoder learnt by the method may thus form a traditional autoencoder or a variational autoencoder.

The method may alternatively form any other generative model, such as a Generative Adversarial Network (as explained in [9]) or a Deep Belief Network (as explained in [10]).

By "computer-implemented", it is meant that steps (or substantially all the steps) are executed by at least one computer, or any system alike. Thus, steps are performed by the computer, possibly fully automatically, or, semi-automatically. In examples, the triggering of at least some of the steps may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 2:
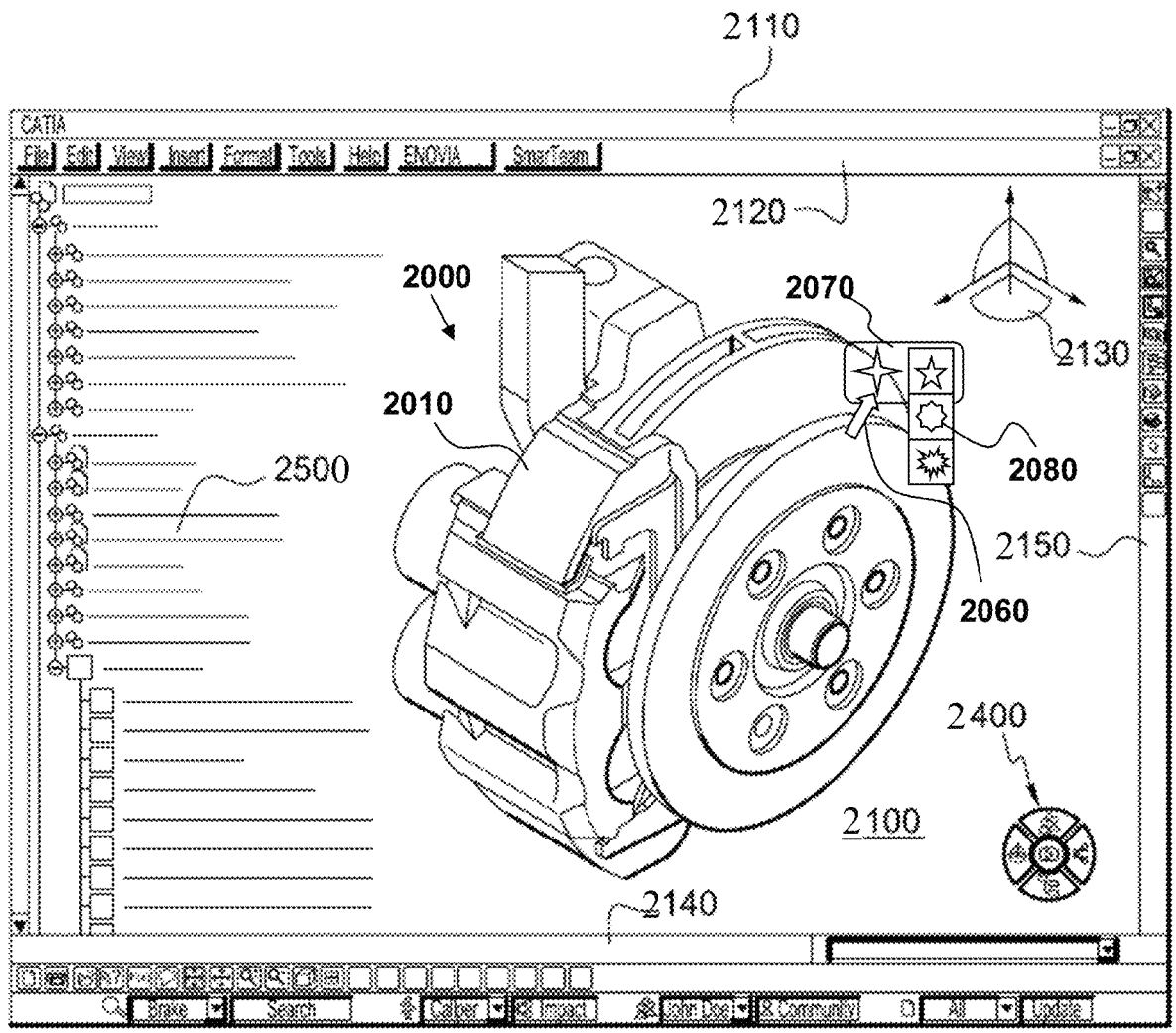
FIG. 2 shows an example of a graphical user interface of the system.

FIG. 2 shows an example of the GUI of the system, wherein the system is a CAD system which may be used for designing and/or adding an image which is a 3D modeled object 2000 to the dataset before launching the method, and/or for displaying such an image as a reconstruction outputted by an autoencoder learnt by the method or before applying the autoencoder or a part thereof to the image.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
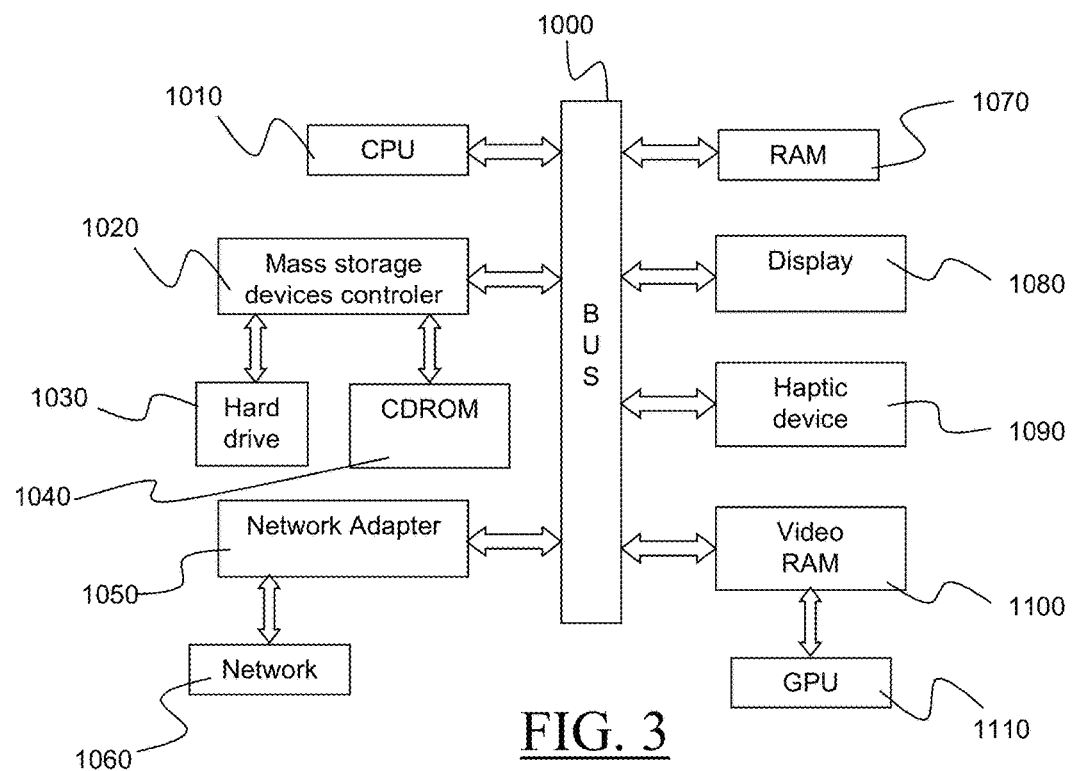
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method is now further detailed referring to different examples which are particularly simple and efficient. In these examples, the images referred to are 3D models. But the following discussions also apply to any type of images. Also, the following discussion focuses on a non-variational autoencoder, but as already pointed out the extension to the variational autoencoder is straightforward, as it only requires an additional regularization term in the loss and a transformation of the architecture to output parameters of a Gaussian distribution instead of a single 3D model.

First example aspects are now discussed.

Let $D=\{x_1, \ldots, x_n\}$ denote a dataset of 3D models which may be provided at S10. Each 3D model may for example by represented as an occupancy volume or a distance field in a voxel grid, meaning that $x_i \in \mathbb{R}^m$, where m is the number of voxels.

Figure 4:
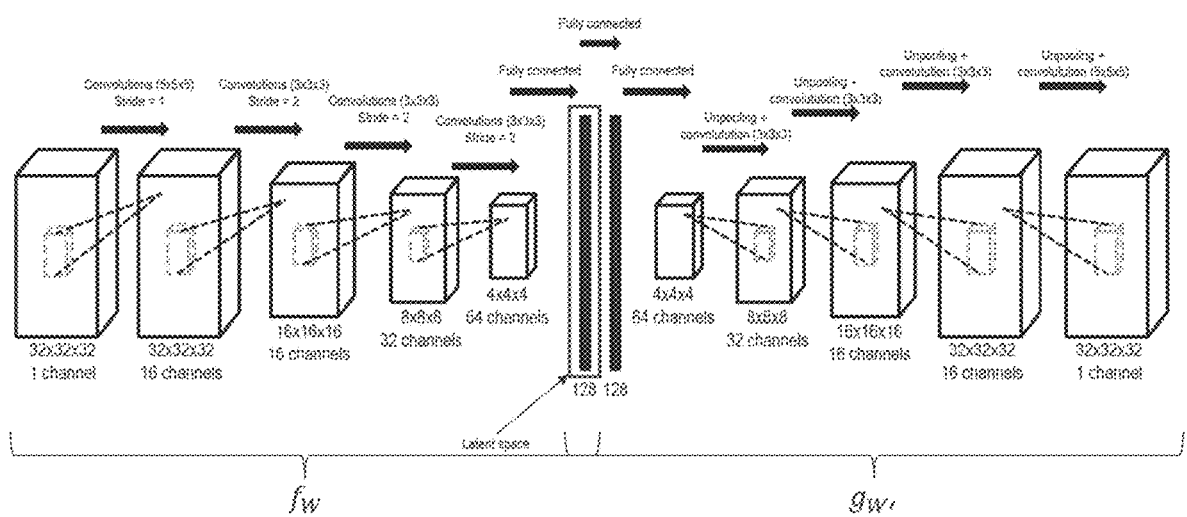
FIGS. 4, 5 and 6 illustrate the method.

The method may perform S20 based on any predetermined autoencoder architecture, such as the convolutional autoencoder shown on FIG. 4, presented for illustrational purpose only as adapted to 32×32×32 input size.

The energy to minimize in the prior art settings may be $E(W,W)=\Sigma_{i=1}^{n}\|g_{W'} \circ f_W(x_i)-x_i\|$, where the norm is usually a L2 or L1 norm. Here, to make the learning more generic and robust, one may first consider replacing the norm with a generic metric d: $E(W,W)=\Sigma_{i=1}^{n}d(g_{W'} \circ f_W(x_i), x_i)$, where d can still be induced by a usual norm, especially in the case where the 3D models are plain (i.e. not surface) occupancy grids or distance fields, but d can also be a specific distance function (such as a Wasserstein distance), especially in the case where the 3D models are surface occupancy grids.

The core of the first example aspects is to quotient the distance on the action of a given transformations group g. That is, in the formulation above the method may replace d(x,y) with $$\inf_{h \in \mathcal{G}} d(x, h \circ y),$$

which leads to the following quotient loss to minimize at S20:

$$E(W, W') = \sum_{i=1}^{n} \inf_{h \in \mathcal{G}} d(g_{W'} \circ f_W(x_i), h \circ x_i).$$

The method may also add to the quotient loss minimized at S20 a regularization term ρ which penalizes the transformation h, to yield the final loss:

$$E(W, W') = \sum_{i=1}^{n} \inf_{h \in \mathcal{G}} (d(g_{W'} \circ f_W(x_i), h \circ x_i) + \rho(h))$$

The regularization term may for example penalize an extent of the transformation or of an aspect of the transformation, such as an extent of stretching.

Second example aspects are now discussed. These second example aspects may be combined with the first example aspects.

In these examples, the autoencoder may be invariant with respect to at least part of the group of transformations. This means that the autoencoder outputs the same result whichever the modification of an image is inputted (according to any one of the at least part of the group of transformations). The part with respect to which the autoencoder is invariant may be equal to or different from the part with respect to which application of the autoencoder is considered for the distance involved in the reconstruction loss. The former part may for example be less dense than the latter part and/or included in the latter part.

In such a case, the learning is authorized to give no weight to the initial configuration of the object representation and can thereby focus on other aspects (such as global shape), such that the autoencoder is even improved.

Furthermore, minimizing the above energy may actually be hard, and the minimization can be stuck into bad local minima. Indeed, g is a better decoder when it can reconstruct all 3D models in a same frame, as its capacity can be dedicated to reconstruct spatial geometric features at the same place in the 3D volume every time. Nevertheless, the latent vector $f(x_i)$ still has in memory the initial orientation of $x_i$, because if for example two inputs x and y differ only by their orientation, f(x) and f(y) will likely be different. The method may thus let the latent vector forget the initial orientation.

A specific configuration for doing so is when the autoencoder includes a transformation component, defined by the fact that it is configured to apply each one of the at least part of the group of transformations to the object representation of an input image, and an aggregation component (e.g. an aggregation view pooling), defined by the fact that it is configured to be applied to results stemming (i.e. originating) from the first component. Such a configuration allows the autoencoder to forget the initial configuration.

Such examples may operate the following framework. Given a traditional autoencoder or a variational autoencoder, the framework may add at the end of the encoder an aggregation view pooling, and replace the norm appearing in the reconstruction loss with a quotient loss. Thus, the framework transforms the traditional autoencoder or variational autoencoder into a quotient autoencoder, that is an autoencoder which learns directly in the quotient space of the models by the action of a group. If one takes the rotations group for example, the autoencoder may learn the intrinsic shape variability of the models independently of the alignment of the input models.

The method may thus close the bridge between pre-processing of the 3D dataset using co-analysis techniques and 3D learning using manifold learning techniques. The method provides an improvement of the autoencoder or variational autoencoder, which may be dedicated to 3D data, in order to efficiently learn non-aligned 3D models. The method yields a better representation of the 3D models and is more efficient on non co-aligned 3D dataset.

The method may also allow to automatically co-align the whole 3D dataset, as the outputs of the autoencoder may be aligned. Moreover, unlike existing methods, in examples the autoencoder may be applied to co-align in real-time any new model which was not present in the dataset. Finally, the framework can be easily extended to co-segment the models or perform other types of co-analysis.

Examples of the aggregation component are now further discussed.

The previous loss may be rewritten as $E(W,W) = \sum_{i=1}^{n} d_q (g_{W'}, \chi f_W(x_i), \bar{x}_i)$, where $d_q$ is the quotient distance, and $\bar{x}_i$ is the orbit of $x_i$ (the equivalence class of $x_i$ under the action of the group), i.e. $\bar{x} = \{h \circ x | h \in g\}$. As can be seen, such a loss depends on the configuration of the input image, as $x_i$ intervenes in the formulation.

To break this dependency, the method may add an aggregation component such as an aggregation view pooling in the encoder f of the network. That is, for each input x of the autoencoder, the method may discretize g by sampling several transformations $h_j \in g$, and pass all the transformed input $h_j(x_i)$ to the same network f, and for each latent vector $z_j = f(h_j(x_i))$, the method may create the aggregated latent vector z by taking for instance the element-wise maximum along each dimension, that is $$z_l = \max_j (z_j)_l.$$

The aggregation view pooling may more generally be a function applied to L latent vectors of dimension p which can be any function $\sigma: (\mathbb{R}^p)^L \to \mathbb{R}^p$ such that a is invariant by permutation, i.e. $\sigma(h_1, \ldots, h_i) = \sigma(\delta(h_1, \ldots, h_L))$ for any $\delta \in S(L)$, and $\sigma(h, 0, \ldots, 0)$ is a surjective function from $\mathbb{R}^p$ to $\mathbb{R}^p$, and $\sigma(h, h, \ldots, h) = h$ for any $h \in \mathbb{R}^p$.

Such a process is called aggregation view pooling. This allows the latent vector to capture the shape x modulo the transformation group g, and thus to be much more robust to local minima. That is f now depends only on $\bar{x}_i$ and not the full input $x_i$, that is it depends on $x_i$ independently of the transformations of g, for example independently of the original frame if g is the rotations group.

The reconstruction loss minimized at S20 may thus be independent of the initial configuration and written as:

$$E(W, W') = \sum_{i=1}^{n} d_q(g_{W'} \circ f_W(\bar{x}_i), \bar{x}_i) = \sum_{i=1}^{n} \inf_{h \in \mathcal{G}} (d(g_{W'} \circ f_W(\bar{x}_i), h \circ x_i) + \rho(h))$$

Where $\rho$ is the optional regularization term.

Such a reconstruction loss may be minimized at S20 in any way, for example using classical stochastic methods, such as stochastic gradient descent, or Adam optimization ([20]: "Adam: A Method for Stochastic Optimization", D. Kingma, J. Ba, in Internation Conference on Learning Representations, 2015).

Figure 5:
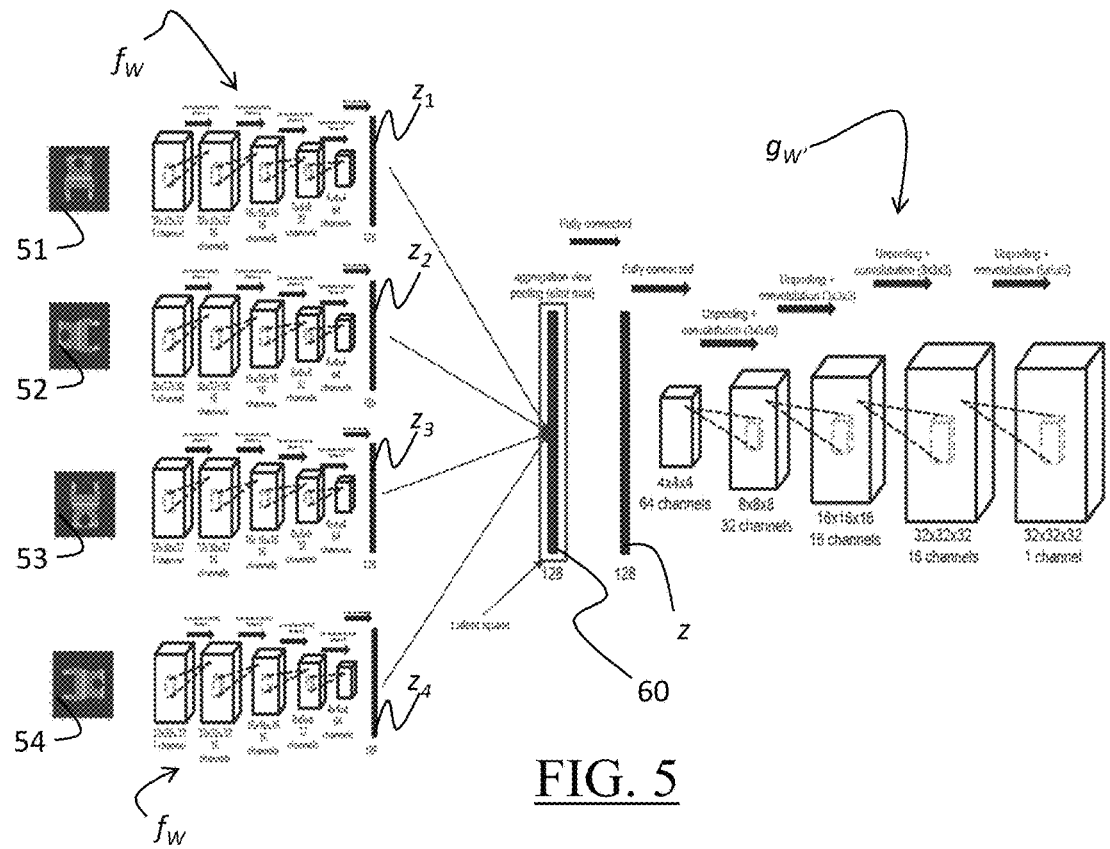

A specific architecture in line with the above examples which provides a particularly good result is now discussed. FIG. 5 shows an example of this architecture, with respect to an input image 51 including a chair representation.

In this architecture, an encoding component $f_W$ is configured to be applied in parallel to each result 51-54 of the transformation component (not represented on the figure). In the example shown on the figure, the images are 3D modeled objects but represented by their 2D projections and the group of transformations g includes rotations. The transformation component is in the example configured to apply each one of the 0° rotation (i.e. the identity), 90° rotation, 180° rotation and 270° rotation with respect to an axis orthogonal and centered relative to the 2D projection of the images. Although not represented on the figure, the part of group g which the transformation component is configured to apply may be larger, which implies additional lines on the figure corresponding to results in addition to those shown.

Now, $f_W$ is applied in parallel to each result 51-54. In other words, $f_W$ is instantiated a number of times equal to the number of results 51-54 outputted by the transformation component. The weights of all instances of $f_W$ may then be shared during the learning S20.

$f_W$ is as in the example of FIG. 4 a CNN, leading to latent vectors $z_i$. Other types of encoders may however be implemented. The autoencoder of this architecture further includes an aggregation view pooling 60 configured to be applied to results stemming from the transformation component, which are the latent vectors $z_i$ outputted by encoder $f_W$ in the example of FIG. 4.

Vectors $z_i$ have a same size, which is size 128 in the example (but any other size could be contemplated). The aggregation view pooling 60 outputs a vector z of the same size 128. Each coordinate l of z has a value $z_l$ equal to $z_l = \max(z_j)_l$. Any other aggregation component such as those mentioned earlier may be implemented.

At this point, the initial orientation of the chair in input image 51 is forgotten. In a sense, the aggregation view pooling 60 may be viewed as a layer with determinist neurons that are configured to forget such orientation. This allows the autoencoder to be invariant with respect to the part of group g applied by the transformation component, and thus the learning to focus on other aspects.

The autoencoder of this architecture further includes a decoding component $g_{W'}$ which is configured to be applied to z e.g. and output an image of the same type as results 51-54. $g_{W'}$ is as in the example of FIG. 4 a CNN. Other types of decoders may however be implemented.

Different applications (possibly combinable together) of the method are now discussed. These applications may implement any of the above examples of the method.

In a first application, the images are surface occupancy 3D models, the group of transformations including translations. This allows obtaining an autoencoder robust with respect to small unwanted shifts which can have particularly bad consequences with respect to the learning in the case of surface occupancy 3D models.

The method may for example start with a dataset of co-aligned 3D models, for examples chairs, and each chair may be modeled as a surface occupation grid. Notably, if some models are open, one cannot voxelize them in plain. A solution would be to learn a classic autoencoder using a standard norm for d, such as the L2 norm. But a slight displacement in the output of the autoencoder leads to a very large reconstruction error for the distance d. One way to learn a more robust autoencoder is thus to apply the autoencoder quotiented by the action of the group made of the 27 small translations {(0 or ±1,0 or ±1,0 or ±1)}, and taking a null penaly ρ. Thus, the loss becomes much more robust to a misalignment of the reconstructed model.

In a second application, the object representations are each a representation of an instance of a same class of objects. Each image of the dataset has a (e.g. single) non-oriented frame. Each object representation is aligned in the non-oriented frame. In such a case, the group of transformations includes all rotations from one alignment in the non-oriented frame to another alignment in the non-oriented frame. This allows obtaining an autoencoder robust with respect to objects which are aligned in their respective images but not provided at S10 with the same orientations. In such a case, by considering the group of all the rotations from one alignment to another, the autoencoder is provided with the possibility to re-align the object representations and thereby learn their shape with more accuracy.

The method may for example start with a dataset of 3D models, for examples chairs, such that each chair has its main axes aligned on the axes of its frame, but the chairs are not consistently aligned in a same frame. Then the method may consider the 24 possible rotations to align consistently each model.

To make learning efficient, as well as co-align the 3D models, the above principles may be used. The method may apply the autoencoder quotiented by the action of the group made of these 24 rotations, with a null penalty ρ.

In that case, $$\inf_{h \in \mathcal{G}}$$

turns out to be a min on a finite of 24 rotations, which is completely tractable. Of course, the method may pre-compute the 24 rotated models $h \circ x_i$ on the initial dataset before the learning.

Once the autoencoder is learnt, it becomes easy to coalign any model of the dataset or any new model never seen before. The method may also compute $$\hat{h} = \underset{h \in \mathcal{G}}{\mathrm{argmin}}\ d(g_{W'} \circ f_W(x_i), h \circ x_i),$$

and the method may apply the transformation $\hat{h}$ to the input.

Figure 6:
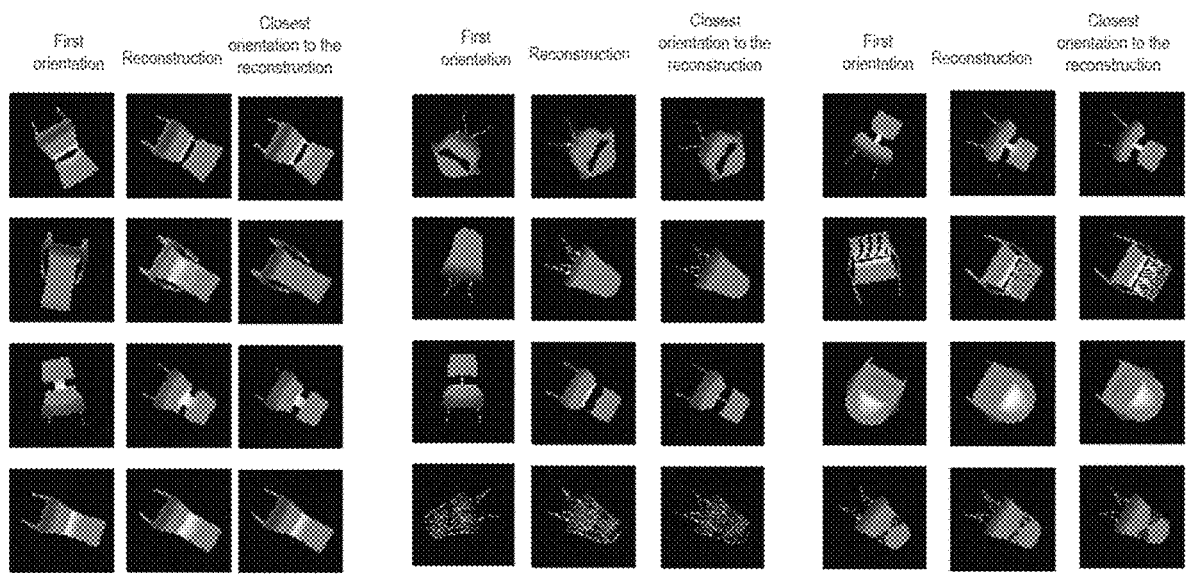

FIG. 6 illustrates running an example of the method on a dataset of 3D models of chairs with the group of rotations. FIG. 6 shows data for twelve images of the dataset, with a first column representing the images of the dataset (in their first or initial orientation), a second column representing the reconstruction of the chair (after applying the autoencoder which was learnt by the method), and a third column representing the closest orientation of the chair relative to the reconstruction, among those obtained by the transformation component. As can be seen, the autoencoder aligns all the chairs of the dataset.

Different examples of the method have been discussed. But the method is not limited to them. Different possible extensions of the above discussions are now discussed.

The previous application can be extended to completely non-aligned 3D models by taking the group of all 3D rotations.

The method may also be applied to other transformations. For instance, the method may work with a dataset which is co-aligned. The method may then consider stretching deformation functions on 3D models, with a high penalization term p for large deformation, to learn to non-rigidly align the 3D models. If one reference model is segmented, the method may transfer this segmentation to any other model using this autoencoder quotiented by non-rigid deformations.

In both cases, the transformation group g is infinite. This does not raise any problem for the aggregation view pooling, as the method may only take a finite number of transformations on the input to go into the encoder. Nevertheless, the minimization of the loss may be more complicated. Two solutions are possible.

The first one is to discretize the group of transformations, as explained earlier.

The second one, is to do a continuous optimization (such as gradient descent or Newton) with multiple starts to find the transformation h which minimizes F $$((W, W'), h) = \inf_{h \in \mathcal{G}}\ d(g_{W'} \circ f_W(x_i), h \circ x_i) + \rho(h).$$

Under mild assumptions, the infimum is actually a minimum, reached in $\hat{h}$. To simplify the notations, let w=(W,W') be the hyper-parameters. The method may be able to compute the gradient of $G(w)=F(w,\hat{h}(w))$ to minimize the loss, which requires to compute the derivatives of $\hat{h}(w)$. Indeed, $\nabla G(w)=J_p(w)^T \nabla F(w,\hat{h}(w))$, where $p:w\mapsto(w,\hat{h}(w))$. So the computation of the Jacobian matrix $J_p$ of p may use the Jacobian matrix $J_{\hat{h}}$ of $\hat{h}(w)$, $$\text{because } J_p(w) = \begin{pmatrix} I \\ J_{\hat{h}}(w) \end{pmatrix}.$$

By definition of $\hat{h}$, $\nabla_h F(w,\hat{h}(w))=0$. Let $q:(w,h)\mapsto \nabla_h F(w,h)$. By the implicit function theorem for several variables, $J_{\hat{h}}(w)=-J_{q,h}(w,\hat{h}(w))^{-1}\ J_{q,w}(w,\hat{g}(w))$, where $J_{q,h}$ is the Jacobian matrix of q with respect to h for fixed w, and $J_{q,w}$ is the Jacobian matrix of q with respect to w for fixed h.

Thus the method can compute the gradient of the loss.

In case where speed is an issue, the method can also neglect in the derivatives computation the impact of the variation of w on the variation of $\hat{h}$, which simplifies to $\nabla G(w)=\nabla_w F(w,\hat{h}(w))$.

The invention claimed is:

1. A computer-implemented method for learning an autoencoder, the method comprising:
   obtaining a dataset of images, each image including a respective object representation: and
   learning the autoencoder based on the dataset, the learning including minimization of a reconstruction loss, the reconstruction loss including a term that penalizes for each respective image a distance between the result of applying the autoencoder to the respective image and the set of results of applying at least part of a group of transformations to the object representation of the respective image,
   wherein the autoencoder is invariant with respect to at least part of the group of transformations,
   wherein the autoencoder includes a transformation component configured to apply each one of the at least part of the group of transformations to the object representation of an input image, an aggregation component configured to be applied to results stemming from the transformation component, an encoding component and a decoding component, and wherein the results stemming from the first component to which the aggregation component is configured to be applied are vectors of a same size, the aggregation component outputting a vector of the same size having for each coordinate a value equal to the maximum among the values of said coordinate for the vectors to which the aggregation component is configured to be applied.

2. The method of claim 1, wherein the encoding component is configured be applied in parallel to each result of the transformation component.

3. The method of claim 2, wherein the aggregation component is configured to be applied to the results of the encoding component.

4. The method of claim 1, wherein the decoding component is configured to be applied to the result of the aggregation component.

5. The method of claim 1, wherein the encoding component and/or the decoding component includes a convolutional neural network.

6. The method of claim 1, wherein the images are surface occupancy 3D models, the group of transformations including translations.

7. A computer-implemented method for learning an autoencoder, the method comprising:
obtaining a dataset of images, each image including a respective object representation; and
learning the autoencoder based on the dataset, the learning including minimization of a reconstruction loss, the reconstruction loss including a term that penalizes for each respective image a distance between the result of applying the autoencoder to the respective image and the set of results of applying at least part of a group of transformations to the object representation of the respective image,
wherein the object representations are each a representation of an instance of a same class of objects, each image of the dataset having a non-oriented frame, each object representation being aligned in the non-oriented frame, the group of transformations including all rotations from one alignment in the non-oriented frame to another alignment in the non-oriented frame.

8. The method of claim 7, wherein the autoencoder is invariant with respect to at least part of the group of transformations.

9. The method of claim 8, wherein the autoencoder includes a transformation component configured to apply each one of the at least part of the group of transformations to the object representation of an input image, an aggregation component configured to be applied to results stemming from the transformation component, an encoding component and a decoding component.

10. The method of claim 9, wherein the encoding component is configured be applied in parallel to each result of the transformation component.

11. The method of claim 10, wherein the aggregation component is configured to be applied to the results of the encoding component.

12. The method of claim 9, wherein the decoding component is configured to be applied to the result of the aggregation component.

13. The method of claim 9, wherein the encoding component and/or the decoding component includes a convolutional neural network.

14. The method of claim 7, wherein the images are surface occupancy 3D models, the group of transformations including translations.

15. A device comprising:
a data storage medium having recorded thereon a data structure, the data structure comprising an encoder, a decoder, and/or the whole of an autoencoder learnable according to computer-implementable instructions for learning an autoencoder, the instructions configuring a processor to:
obtain a dataset of images, each image including a respective object representation, and
learn the autoencoder based on the dataset, the learning including minimization of a reconstruction loss, the reconstruction loss including a term that penalizes for each respective image a distance between the result of applying the autoencoder to the respective image and the set of results of applying at least part of a group of transformations to the object representation of the respective image,
wherein the autoencoder is invariant with respect to at least part of the group of transformations,
wherein the autoencoder includes a transformation component configured to apply each one of the at least part of the group of transformations to the object representation of an input image, an aggregation component configured to be applied to results stemming from the transformation component, an encoding component and a decoding component, and
wherein the results stemming from the first component to which the aggregation component is configured to be applied are vectors of a same size, the aggregation component outputting a vector of the same size having for each coordinate a value equal to the maximum among the values of said coordinate for the vectors to which the aggregation component is configured to be applied.

16. The device of claim 15, wherein the device further comprises the processor coupled to the data storage medium.

17. A device comprising:
a data storage medium having recorded thereon a data structure, the data structure comprising a computer program including instructions for learning an autoencoder, the instructions configuring a processor to:
obtain a dataset of images, each image including a respective object representation, and
learn the autoencoder based on the dataset, the learning including minimization of a reconstruction loss, the reconstruction loss including a term that penalizes for each respective image a distance between the result of applying the autoencoder to the respective image and the set of results of applying at least part of a group of transformations to the object representation of the respective image,
wherein the autoencoder is invariant with respect to at least part of the group of transformations,
wherein the autoencoder includes a transformation component configured to apply each one of the at least part of the group of transformations to the object representation of an input image, an aggregation component configured to be applied to results stemming from the transformation component, an encoding component and a decoding component, and wherein the results stemming from the first component to which the aggregation component is configured to be applied are vectors of a same size, the aggregation component outputting a vector of the same size having for each coordinate a value equal to the maximum among the values of said coordinate for the vectors to which the aggregation component is configured to be applied.

18. The device of claim 17, wherein the device further comprises the processor coupled to the data storage medium.

19. The device of claim 17, wherein the encoding component is configured be applied in parallel to each result of the transformation component.

20. The device of claim 17, wherein the aggregation component is configured to be applied to the results of the encoding component.

21. The device of claim 17, wherein the decoding component is configured to be applied to the result of the aggregation component.

22. The device of claim 17, wherein the encoding component and/or the decoding component includes a convolutional neural network.

23. A device comprising:
a data storage medium having recorded thereon a data structure, the data structure comprising a computer program including instructions for learning an autoencoder, the instructions configuring a processor to:
obtain a dataset of images, each image including a respective object representation, and
learn the autoencoder based on the dataset, the learning including minimization of a reconstruction loss, the reconstruction loss including a term that penalizes for each respective image a distance between the result of applying the autoencoder to the respective image and the set of results of applying at least part of a group of transformations to the object representation of the respective image,
wherein the results stemming from the first component to which the aggregation component is configured to be applied are vectors of a same size, the aggregation component outputting a vector of the same size having for each coordinate a value equal to the maximum among the values of said coordinate for the vectors to which the aggregation component is configured to be applied.

24. The device of claim 23, wherein the device further comprises the processor coupled to the data storage medium.

25. The device of claim 23, wherein the autoencoder is invariant with respect to at least part of the group of transformations.

26. The device of claim 25, wherein the autoencoder includes a transformation component configured to apply each one of the at least part of the group of transformations to the object representation of an input image, an aggregation component configured to be applied to results stemming from the transformation component, an encoding component and a decoding component.

27. The device of claim 26, wherein the aggregation component is configured to be applied to the results of the encoding component.

28. The device of claim 25, wherein the encoding component is configured be applied in parallel to each result of the transformation component.

29. The device of claim 23, wherein the decoding component is configured to be applied to the result of the aggregation component.

30. The device of claim 23, wherein the encoding component and/or the decoding component includes a convolutional neural network.

31. A device comprising:
a data storage medium having recorded thereon a data structure, the data structure comprising an encoder, a decoder, and/or the whole of an autoencoder learnable according to computer-implementable instructions for learning an autoencoder, the instructions configuring a processor to:
obtain a dataset of images, each image including a respective object representation, and
learn the autoencoder based on the dataset, the learning including minimization of a reconstruction loss, the reconstruction loss including a term that penalizes for each respective image a distance between the result of applying the autoencoder to the respective image and the set of results of applying at least part of a group of transformations to the object representation of the respective image,
wherein the results stemming from the first component to which the aggregation component is configured to be applied are vectors of a same size, the aggregation component outputting a vector of the same size having for each coordinate a value equal to the maximum among the values of said coordinate for the vectors to which the aggregation component is configured to be applied.

* * * * *